Dec. 19, 1961    P. PATZ ET AL    3,013,651
FLIGHT CLEANER FOR BARN CLEANERS
Filed April 10, 1961    2 Sheets-Sheet 1
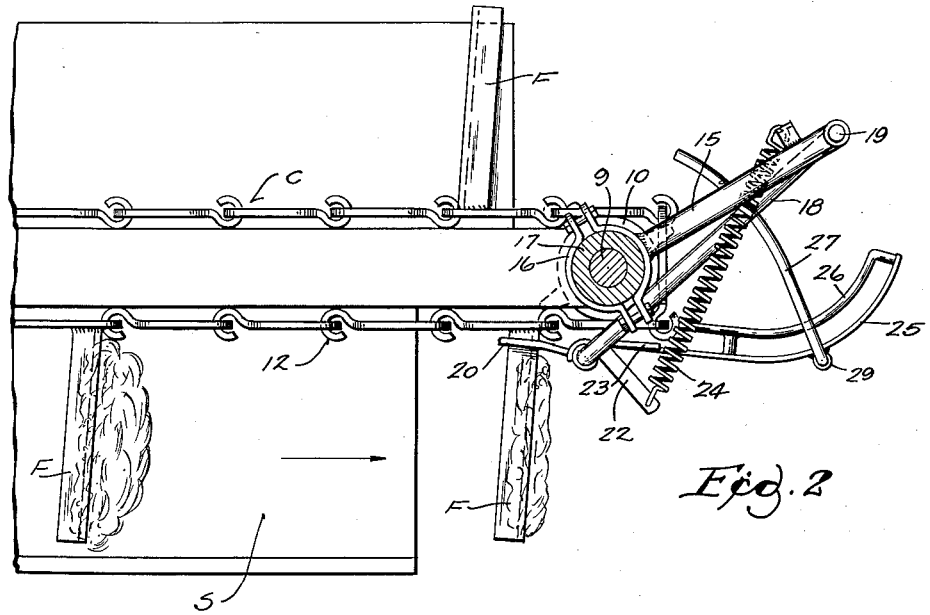
Fig. 2
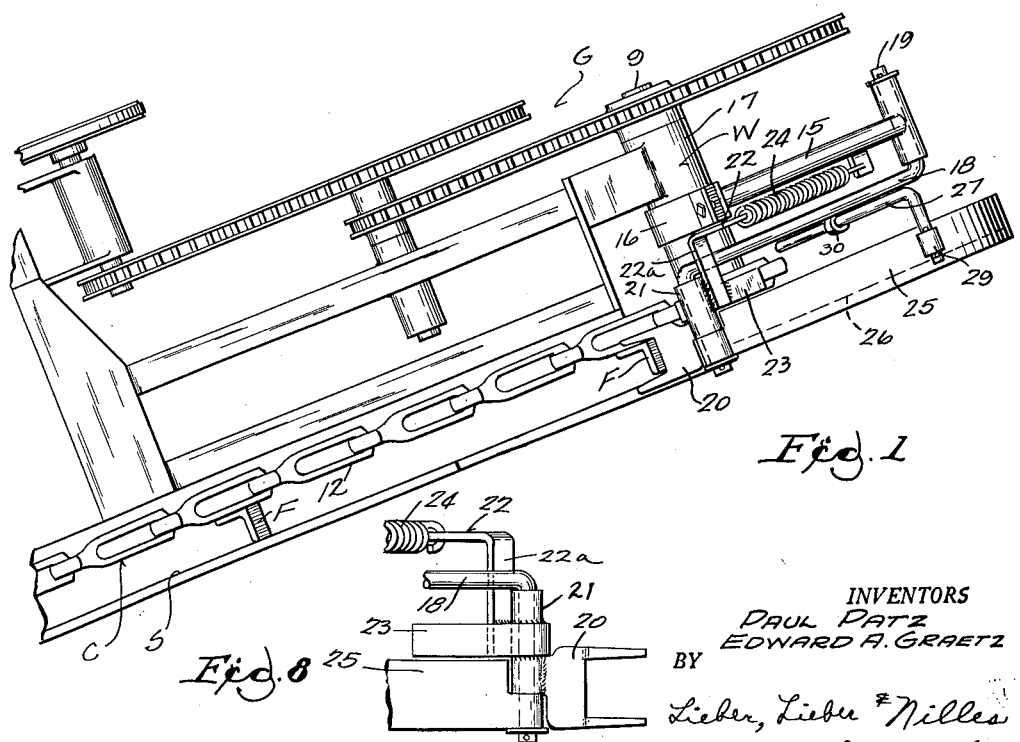
Fig. 1
Fig. 8
INVENTORS
PAUL PATZ
EDWARD A. GRAETZ
BY Lieber, Lieber & Nilles
ATTORNEYS

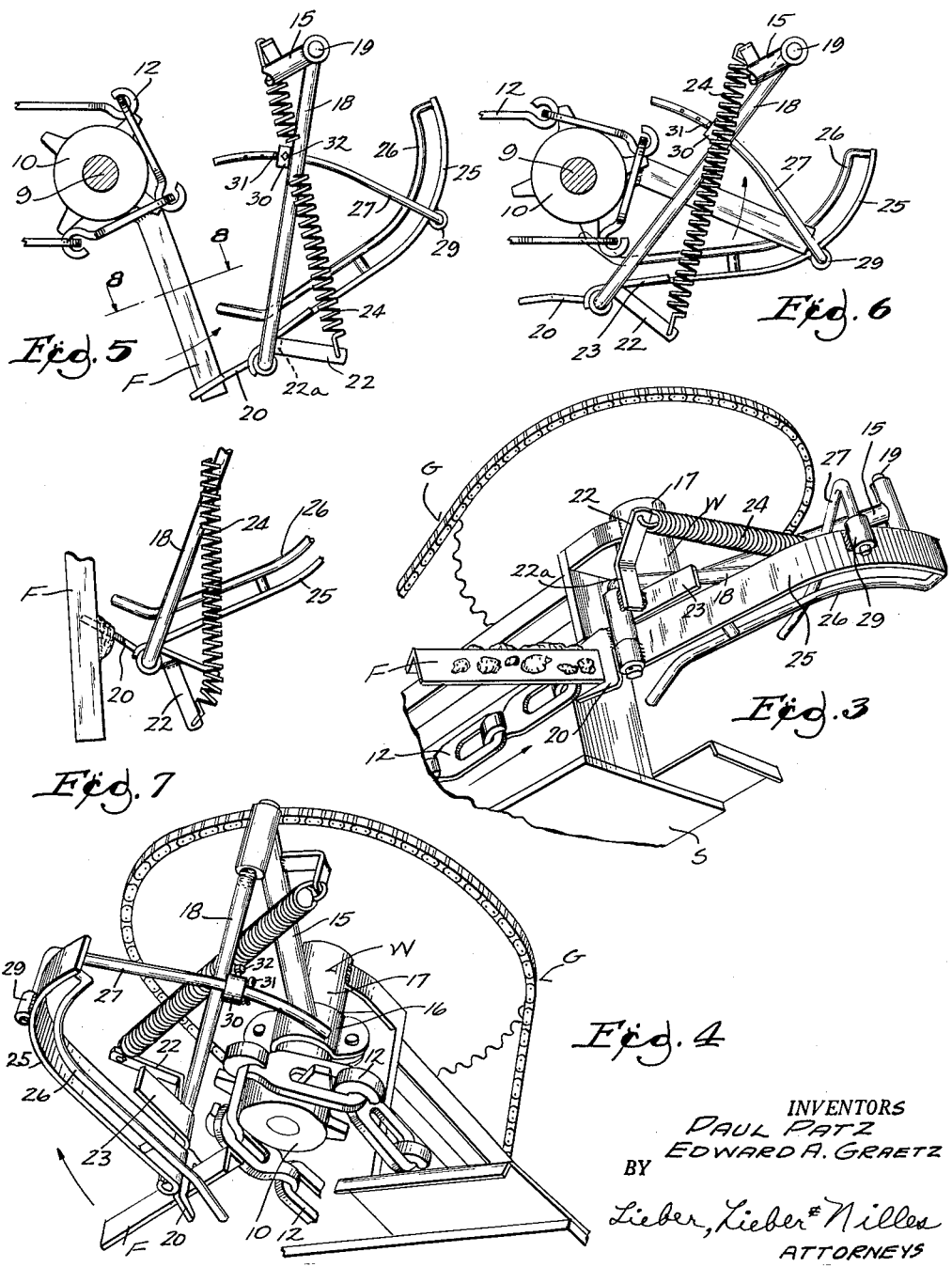

United States Patent Office 3,013,651
Patented Dec. 19, 1961

3,013,651
FLIGHT CLEANER FOR BARN CLEANERS
Paul Patz and Edward A. Graetz, Pound, Wis.
Filed Apr. 10, 1961, Ser. No. 101,861
9 Claims. (Cl. 198—229)

The present invention relates generally to barn cleaners of the type having an endless chain and a series of spaced flights each secured at one end along the length of the chain and extending outwardly from the chain to terminate in a free end. The chain is trained around suitable guides and pulleys located in the various troughs in the barn and then passes a discharge area. The flights are dragged by the chain through the troughs to thereby push the manure along the trough and eventually to the discharge area.

The discharge portion of the cleaner usually consists of an elevated ramp up which the manure is pushed and from the upper end of which it may fall onto a manure spreader. As the manure falls from the ramp, the chain turns around the end sprocket at the discharge end of the ramp and in doing so the flights conventionally swing rapidly around to reverse their direction of travel. As these flights are usually of considerable size and mass, they swing around the end sprocket with considerable velocity, momentum and a violent slapping action, all of which is detrimental to the life of the component parts of the cleaner.

More specifically, the present invention relates to an improved mechanism for positively cleaning the flights as they swing over the discharge area.

The manure and other material moved by the flights is very heavy, cohesive and tends to adhere rather firmly to the flights. If this material is not continually scraped from the flights, it will eventually build up to such an extent as to cause malfunctioning and non-functioning of the entire cleaner. Furthermore, if the material is not wiped clean from the flights at the discharge end of the cleaner, it will be returned to the troughs to furthermore aggravate the manure removal problem.

Accordingly, the present invention provides an improved flight cleaning mechanism for a barn cleaner. More particularly, the construction and operation of the flight cleaner is such that the scraper forcefully penetrates the mass of material as the flight to be cleaned approaches the discharge area. This forceful and positive initial penetration insures that the scraper will come into contact with the flight early in the scraping procedure and at a point on the flight which is closely adjacent to its point of attachment to the endless chain. This action is such that complete scraping action occurs across the entire length of the flight.

Another aspect of the invention provides an arcuate flight retarder against which the outer end of the flight bears as it travels around the discharge end of the cleaner. The action of the retarder is such as to ease the scraper back into its initial position without any heavy shock loads or slapping action being imposed on the cleaner. Stated otherwise, the arcuate retarder cooperates with the swinging end of the flight to ease or guide the spring loaded scraper back into its initial position. A smoothly operating and yet forceful scraping action is thereby provided.

Still another and more specific aspect of the improved flight cleaner relates to a safety release device to accommodate bent or otherwise damaged flights and thereby avoid damage to the cleaner. This safety device permits the scraper to be set at a predetermined maximum force, above which the scraper will be released and pass harmlessly over the obstruction.

These and other objects of the invention will appear hereinafter as this disclosure progresses, reference being had to the accompanying drawings in which:

FIGURE 1 is a fragmentary side elevation of an improved barn cleaner made in accordance with the present invention, certain parts being shown as broken away or removed for clarity;

FIGURE 2 is a plan view of the device shown in FIGURE 1;

FIGURE 3 is a perspective view of a fragment of the barn cleaner shown in FIGURE 1, the view being taken generally from beneath the discharge end and showing the device at the start of a cleaning stroke;

FIGURE 4 is a view similar to FIGURE 3 but taken from the opposite side of the discharge end and showing the scraper when it has moved to a position intermediate the length of the flight being cleaned;

FIGURE 5 is a fragmentary plan view similar to FIGURE 2, but showing the scraper when it has reached the end of the flight being cleaned;

FIGURE 6 is a view similar to FIGURE 5, but showing the flight when it has travelled over a portion of the arcuate guide and when the latter has partially returned to its original position;

FIGURE 7 is a view generally similar to FIGURE 5, but showing the scraper bent to the release position as when encountering material which has been frozen to the flight being cleaned; and FIGURE 8 is a fragmentary elevational view taken generally along line 8—8 in FIGURE 5.

Referring in greater detail to the drawings, an inclined discharge ram or slide S is usually positioned outside of the barn and an endless chain conveyor C moves first upwardly in the slide, causing the material to be pushed from the upper or discharge end of the slide. As the material is discharged and falls by gravity into a waiting manure spreader or the like, the conveyor turns about 180 degrees and then moves downwardly along the opposite side of the slide and back into the area to be cleaned, in the well-known manner.

The drive for the endless chain type conveyor is furnished by an electric motor (not shown) mounted adjacent the discharge end of the slide. The motor through suitable reduction gearing G in the form of sprocket wheels and chains, drives the shaft 9 which is rotatably mounted in the framework W at the discharge end of the slide. A sprocket 10 is fixed to the lower end of the drive shaft 9 and over which the flexible endless chain 12 of the conveyor passes.

The cleaning flights F shown for the purposes of illustration are comprised of heavy angle iron sections, the inner ends of which are rigidly secured as by welding to certain links of the endless chain. The flights extend away from the chain in generally right angular relationship thereto and the tautness of the chain holds them generally in this position as they travel through the various troughs and discharge slide. The other end of the flights terminate in a free end which pass closely adjacent to the trough wall for thorough cleaning thereof.

As these flights swing around the drive sprocket 10 at the upper end of the discharge slide, their free ends swing rapidly and forcefully in making this 180 degree turn. These flights are of considerable weight and size and consequently this swinging action is quite violent.

The heavy and cohesive nature of the material moved by the flights tends to cause it to adhere to anything it comes in contact with. Serious problems have heretofore arisen in devices of this character due to the difficulty encountered in properly and completely cleaning the flights at the discharge end of the barn cleaner. If not removed, this sticky mass builds up on the flights and becomes hardened to such an extent that it is difficult to remove.

The present invention accordingly provides an improved means for insuring that each flight is completely scraped free of material as it swings over the discharge location. The scraping means provided by the present invention acts with a considerable initial thrust to forcefully penetrate the material and thereby come into early and complete contact with the flight. This initial contact is made at a location closely adjacent to the point where the flight is attached to the endless chain, thereby insuring that the scraper commences cleaning action at the proper time.

The improved flight cleaning means functions to guide the free swinging end of the flights in their arcuate movement around the end sprocket and also serves to ease the spring loaded scraper gently back into its original position where it can contact the succeeding flight and repeat the cleaning operation. The arrangement is such that any heavy shock loads or slapping action caused by the spring in returning the scraper are eliminated.

The improved scraper mechanism is mounted to the frame W by the bracket 15 which is clamped by its yoke 16 to the upstanding tubular member 17 of the frame W. A scraper arm 18 is swingably mounted by its upturned portion 19 about a generally vertical axis at the outer end of the bracket. The scraper could otherwise be secured directly to the main frame of the barn cleaner in any suitable manner, other than by the use of a special bracket. At any rate, the scraper is swingably mounted in respect to the barn cleaner in general.

The fork-shaped scraper 20 embraces the forward side of the flight and as the continually moving flight moves in an arcuate path the scraper is forcibly moved over the length of the flight to wipe the material thoroughly therefrom. This scraper is pivotally mounted by its tubular portion 21 on a downwardly extending end of the scraper arm. The scraper has a lever 22 secured by welding to its tubular portion and also has a short arm 23 extending in a direction opposite to the fork-like portion. A heavy tension spring 24 acts between the lever 22 of arm 18 and the bracket 15.

Also pivotally mounted on the downwardly extending portion of the scraper arm is an arcuate guide 25 which curves generally in the direction in which the outer end of the flight rotates as it is swung around the end sprocket. The guide includes a lower support rod 26 on which the outer end of the flight rests as it swings against the guide. A rod 27 is pivotally mounted by its downwardly extending end in the tubular bracket 29 secured to the outer side of the guide. The curved free end of this arm is slidably mounted in another tubular bracket 30 which is welded to the scraper arm. A cotter key 31 extending through the rod 27 limits the outward extent to which the guide can swing. A set screw 32 extends through the tubular bracket 30 and serves to lock the guide in any one of a number of adjusted positions relative to the scraper arm.

Thus the guide is adjustably fixed in relation to the scraper arm for swinging as a unit therewith. The adjustment is for the purpose of accommodating flights of different lengths. The scraper fork is pivoted on the scraper arm and can swing relative to the arm and guide when a force over a predetermined maximum is encountered, as will later appear. Normally however the scraper fork and guide swing together as a unit and are biased inwardly toward the endless chain by the action of the heavy spring 24.

The mounting and position of the spring relative to the swinging cleaner is such that it initially acts with considerable leverage to tightly hold the scraper close to the chain and normally to the oncoming flight. It is at this time that considerable holding force by the spring is required. However as the flight moves and forces the scraper outwardly toward the end of the flight, the effective leverage of the spring is decreased. The result is to provide great penetration pressure for the scraper initially, and then as the scraper approaches the end of the flight and assumes a lesser angular relationship thereto, the spring pressure of the scraper on the flight decreases. This has the desirable effect of reducing the twisting leverage of the flight on its conveying chain and reduces the horsepower requirement which would otherwise be necessary to pull the flight against the resistance of the scraper; it also has the desirable effect of returning the scraper to its original position with less violence, as will appear.

As the flight approaches the cleaning mechanism, the fork is positioned normally at a right angle to the flight and is located closely adjacent to the endless chain. The spring holds the fork tightly in this inward position, and the fork acts with a high penetration force to positively penetrate the material being moved ahead of the flight. It is important that the fork contact the flight at the extreme inner end of the latter so that when the scraping action commences the entire flight will be wiped clean.

FIGURE 5 shows the position of the scraper when it has reached the outer end of the flight being cleaned, and just prior to the end of the flight commencing its contact with the arcuate guide. At this time the material has been thoroughly wiped from the flight in a radially outward direction causing the material to be thrown or pushed from the end of the flight. During the entire wiping action the spring has acted with progressively decreasing pressure to forcefully hold the fork in embracing position over the forward side of the flight.

Immediately after the flight has left the forked scraper, the outer end of the flight commences its contact with the guide; in other words, the movement of the flight past the scraper and onto the guide is a smooth and continuous movement.

FIGURE 6 shows the position of the flight when it has traveled approximately half-way past the guide and during which time it acts to hold the guide and scraper from uncontrollably swinging under influence of the spring and back to its initial position. In other words, the outer end of the cleaned flight slidingly bears against the arcuate guide as it makes its 180 degree turn, and serves to ease the cleaning mechanism back into its initial position.

The guide also reacts on the flight to prevent it from swinging wildly around the sprocket and furthermore acts to support the weight of the flight, which is otherwise unsupported because the bottom of the slide does not extend around the outer end of the ramp.

The resulting operation insures that the scraper positively penetrates the material and wipes the entire flight clean. The guide permits the cleaning unit to swing gently to its initial position without shock loads or slapping action on any of the structure. The guided and supported flight swings smoothly during the cleaning operation and around the sprocket.

As shown in FIGURE 7, in the event a bent or otherwise damaged flight is encountered by the scraper, the scraper will pivot inwardly and relative to the scraper arm and guide, and against the action of the spring. In normal operation however the scraper is aligned with the initial or straight portion of the guide and is prevented from outward swinging relative thereto because downwardly extending portion 22a of the lever 22 contacts the scraper arm 18 as shown best in FIGURE 8 and is held tightly there against by the action of the spring. Normally the scraper arm, guide and scraper swing together as a unit.

The present invention provides a highly efficient flight cleaning mechanism which operates smoothly and contributes materially to the increased life of the entire unit.

Various modes of carrying out the invention are contemplated as being within the scope of the following claims particularly pointing out and distinctly claiming the subject matter which is regarded as the invention.

What is claimed and desired to be secured by Letters Patent is:

1. A barn cleaner mechanism having a continuously moving endless conveyor chain and a series of flights each secured at one of their ends to said chain and having a free end extending therefrom, and means for swinging said flights in an arcuate path over a discharge area, a flight cleaner mounted on said mechanism adjacent said area and comprising, a flight scraper swingably mounted for swinging from a starting position where it initially contacts a flight adjacent to said one end thereof and then in scraping contact with said flight and past the free end thereof, yielding means for returning said scraper to its starting position and yieldingly holding it there, and a guide secured to said scraper for swinging therewith and slidingly engageable by said flight after the latter has been cleaned by said scraper and continues to swing in said arcuate path, whereby said moving flight yieldingly retards the swinging action of said scraper in the return direction under influence of said yielding means.

2. A device as defined in claim 1 further characterized in that said means is a spring which is connected between said scraper and mechanism in such a way that it acts with decreasing pressure on the scraper to return the latter as it swings toward the free end of said flight being cleaned.

3. A barn cleaner mechanism having a continuously moving endless conveyor chain and a series of flights each secured at one of their ends to said chain and having a free end extending therefrom, and means for swinging said flights in an arcuate path over a discharge area, a flight cleaner comprising, a bracket rigidly secured to said mechanism adjacent said area, a flight scraper swingably mounted on said bracket for swinging from a starting position where it initially contacts a flight adjacent to said one end thereof and then in scraping contact with said flight and past the free end thereof, yielding means connected with said scraper for returning it to its starting position and yieldingly holding it there, and a guide in alignment with said scraper for swinging therewith and slidingly engageable by said flight after the latter has been cleaned by said scraper and continues to swing in said arcuate path, whereby said moving flight yieldingly retards the swinging action of said scraper in the return direction under influence of said yielding means.

4. A device as defined in claim 3 further characterized in that said yielding means is a spring connected between said scraper and said bracket.

5. A flight cleaner for use with a barn cleaner mechanism of the type having a continuously moving endless conveyor chain with a series of flights each secured at one of their ends to said chain and having a free end extending therefrom, and means for swinging said flights in an arcuate path over a discharge area, said flight cleaner being adapted to be mounted on said mechanism and adjacent said area; said flight cleaner comprising, a flight scraper swingably mounted for swinging from a starting position where it initially contacts a flight adjacent to said one end thereof and then in scraping contact with said flight and past the free end thereof, yielding means for returning said scraper to its starting position and yieldingly holding it there, and a guide secured to said scraper for swinging therewith and slidingly engageable by said flight after the latter has been cleaned by said scraper and continues to swing in said arcuate path, whereby said moving flight yieldingly retards the swinging action of said scraper in the return direction under influence of said yielding means.

6. In a barn cleaner mechanism of the type having a continuously moving endless conveyor with a series of flights each secured at one of their ends to said conveyor and having a free end extending therefrom, and means for swinging said flights in an arcuate path over a discharge area, a flight cleaner adapted to be mounted on said mechanism and adjacent said area; the improvement residing in said flight cleaner and comprising, a flight scraper swingably mounted for swinging from a starting position where it initially contacts a flight adjacent to said one end thereof and then in scraping contact with said flight and past the free end thereof, resilient means for returning said scraper to its starting position and yieldingly holding it there, and a guide secured to said scraper for swinging therewith and slidingly engageable by said flight after the latter has been cleaned by said scraper and continues to swing in said arcuate path, whereby said moving flight yieldingly retards the swinging action of said scraper in the return direction under influence of said resilient means.

7. A flight cleaner for a barn cleaner mechanism and comprising, a bracket having means for rigid attachment to said mechanism, a flight scraper swingably mounted on said bracket, a resilient means connected to said scraper for urging the latter in one direction, and guide means connected with said scraper for swinging therewith, said guide means having a surface adapted to contact a flight after the latter has been cleaned by said scraper to thereby retard the action of said resilient means in urging the scraper in said one direction.

8. A flight cleaner for a barn cleaner mechanism and comprising, a bracket having means for rigid attachment to said mechanism, an arm swingably mounted on said bracket, a flight scraper pivotally mounted on said arms for swinging therewith, resilient means between said scraper and bracket for urging the latter in one direction, and guide means in alignment with said scraper and having a surface adapted to contact a flight after the latter has been cleaned by said scraper to thereby retard the action of said resilient means in urging the scraper in said one direction.

9. A flight cleaner for a barn cleaner mechanism and comprising, a bracket having means for rigid attachment to said mechanism, an arm swingably mounted on said bracket, a flight scraper pivotally mounted on said arm, resilient means between said scraper and bracket for urging the latter in one direction, and guide means secured to said arm and in alignment with said scraper when the latter is in a normal position, said guide means having a surface adapted to contact a flight after the latter has been cleaned by said scraper to thereby retard the action of said resilient means in urging the scraper in said one direction, said scraper being pivotally mounted on said arm and relative to said guide means and urged into alignment with said guide means by said resilient means.

No references cited.